United States Patent [19]

Toby

[11] Patent Number: 4,718,536
[45] Date of Patent: Jan. 12, 1988

[54] STACK STORAGE ELEVATOR FOR SLICED, STACKED COMESTIBLE PRODUCTS

[75] Inventor: Edward P. Toby, San Rafael, Calif.

[73] Assignee: Toby Enterprises, San Francisco, Calif.

[21] Appl. No.: 919,139

[22] Filed: Oct. 15, 1986

[51] Int. Cl.$^4$ .......................... B65G 1/00; B65G 37/00
[52] U.S. Cl. ................................ 198/469.1; 198/347; 198/464.4; 198/474.1
[58] Field of Search ............... 198/469.1, 464.4, 473.1, 198/474.1, 475.1, 483.1, 347, 801

[56] References Cited

U.S. PATENT DOCUMENTS

| | | | |
|---|---|---|---|
| 3,593,862 | 7/1971 | Pierson | 198/464.4 |
| 4,273,234 | 6/1981 | Bourgeois | 198/347 |
| 4,274,535 | 6/1981 | Haas et al. | 198/801 X |
| 4,499,987 | 2/1985 | Long | 198/347 |

*Primary Examiner*—James T. McCall
*Attorney, Agent, or Firm*—Harris Zimmerman; Howard Cohen

[57] ABSTRACT

A stack storage elevator for sliced, stacked comestible products includes a frame assembly disposed adjacent to a roller conveyor interposed in a conveyor delivering stacked slices to a packaging apparatus. A pair of vertically spaced sprocket wheels are secured to the frame to support an endless chain loop, one half of the loop traversing a vertically extending guide channel in the frame assembly. A plurality of elevator platform assemblies are provided, each secured to a link of the chain loop and arrayed in spaced, stacked relationship thereabout. Each elevator platform assembly includes a plurality of tines extending in parallel relationship from a pivot shaft joined to the respective chain link. The tines, which are disposed to define a platform adapted to support a stack of sliced comestible product, are spaced to interdigitate with the rollers of the conveyor. Each platform supports one stack of acceptable weight and conformation; the chain mechanism is advanced incrementally to drive a platform downwardly to deposit a stack on the rollers of the conveyor whenever a vacant spot appears on the conveyor.

12 Claims, 9 Drawing Figures

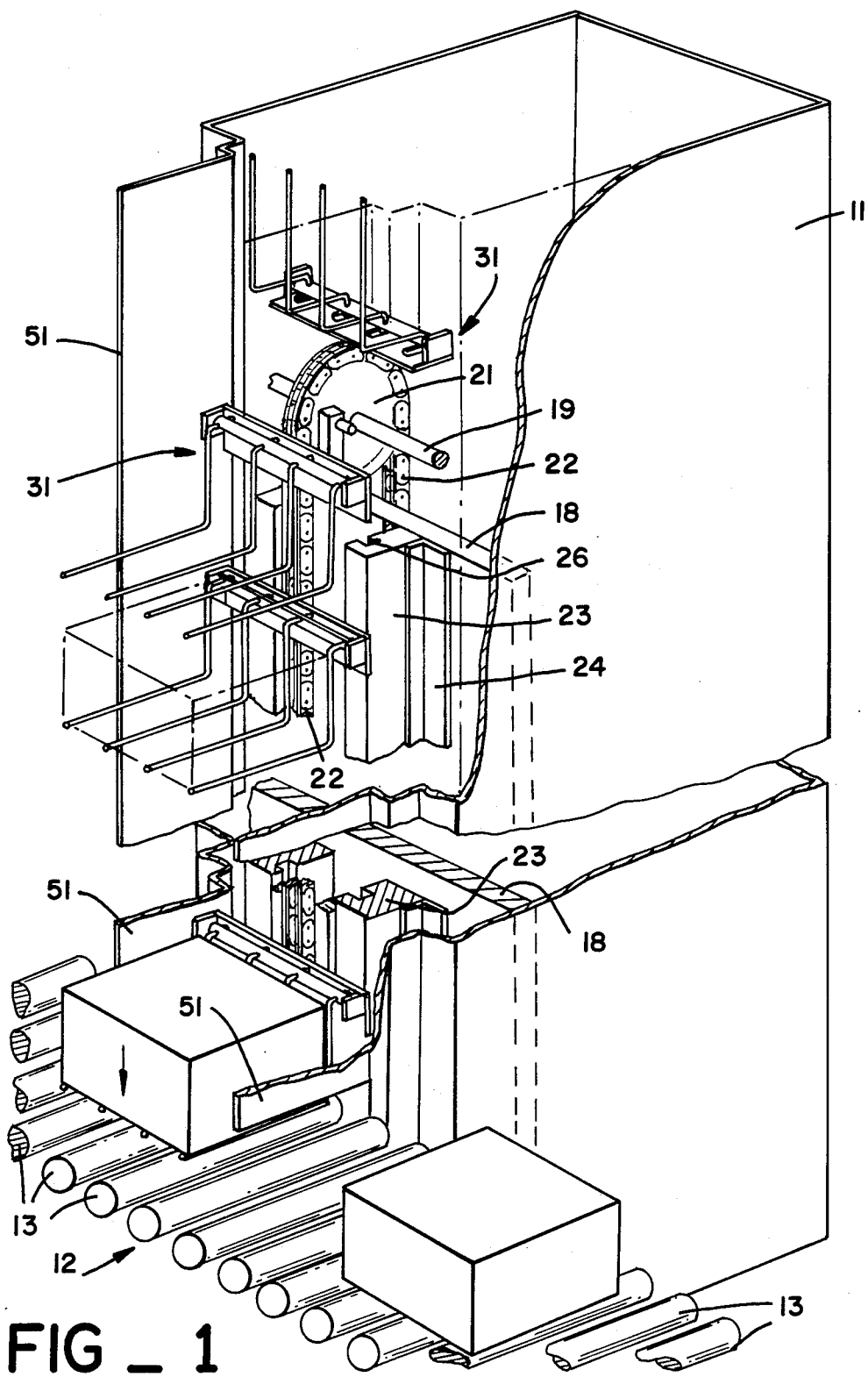
FIG_1

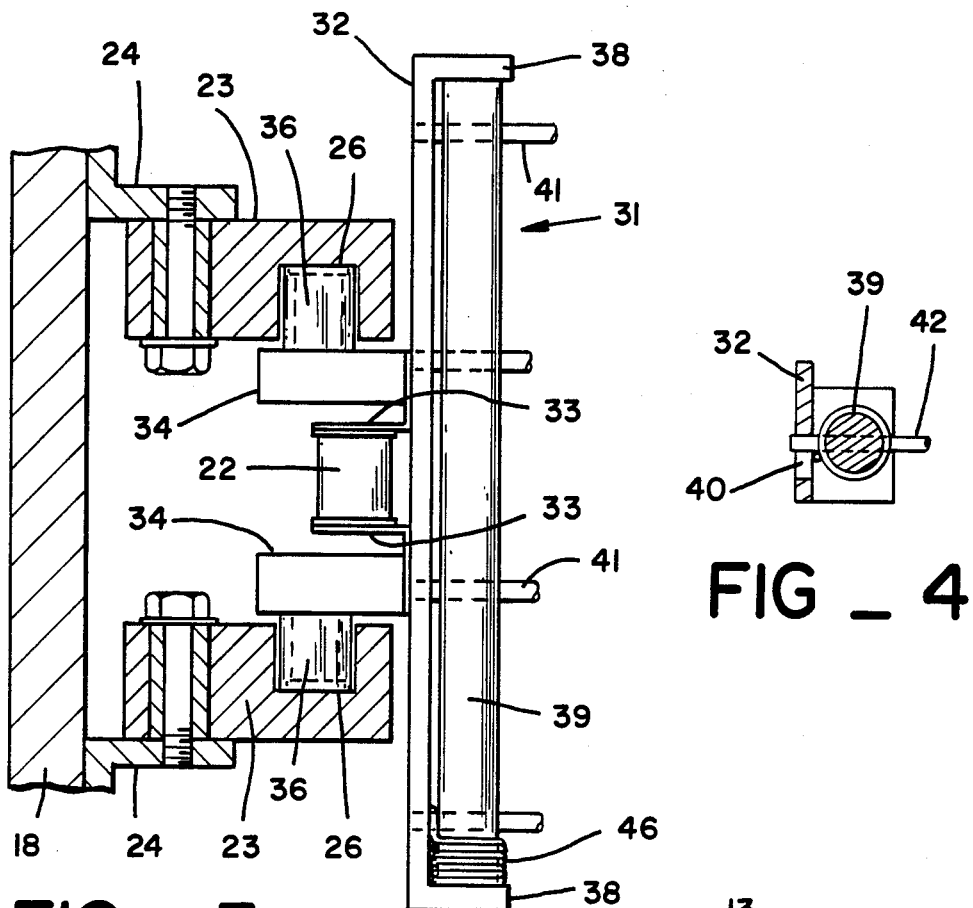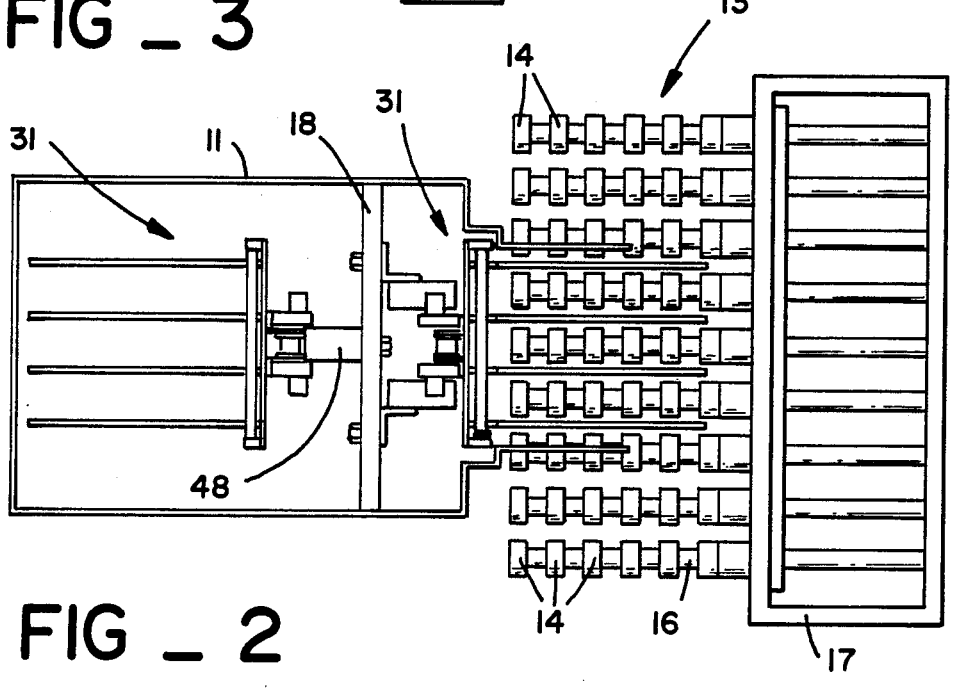

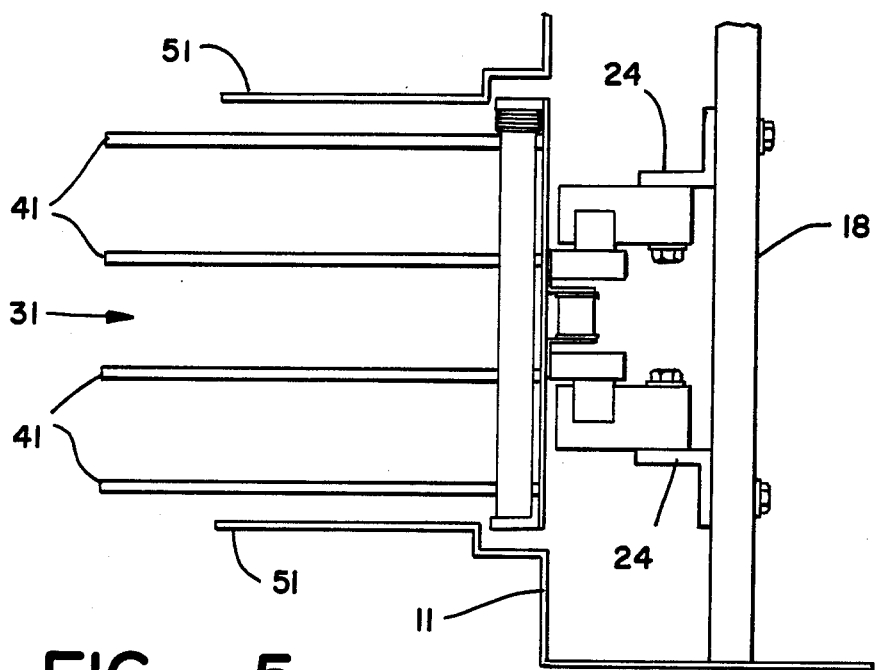
FIG_5
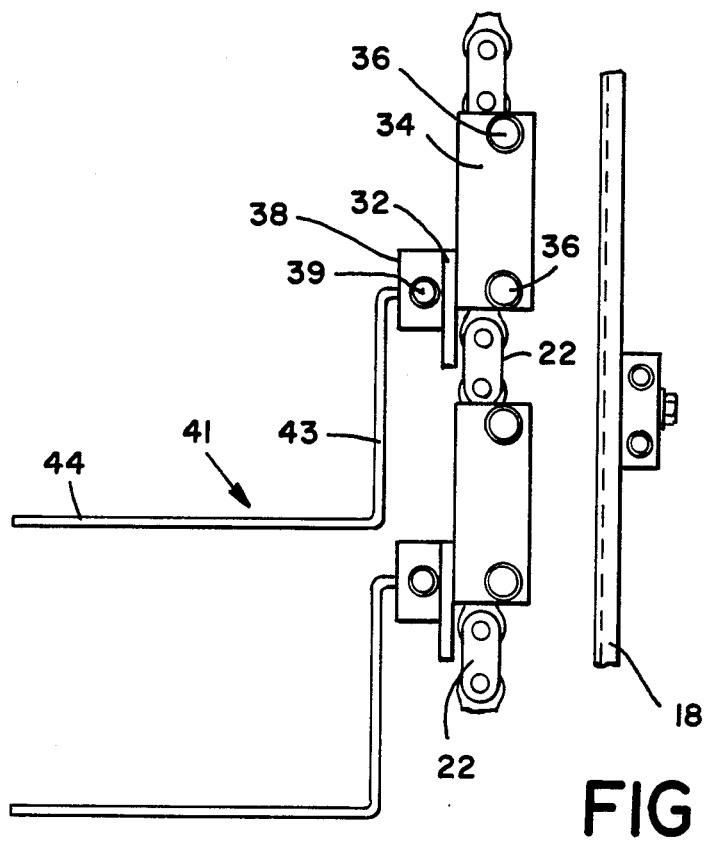
FIG_6

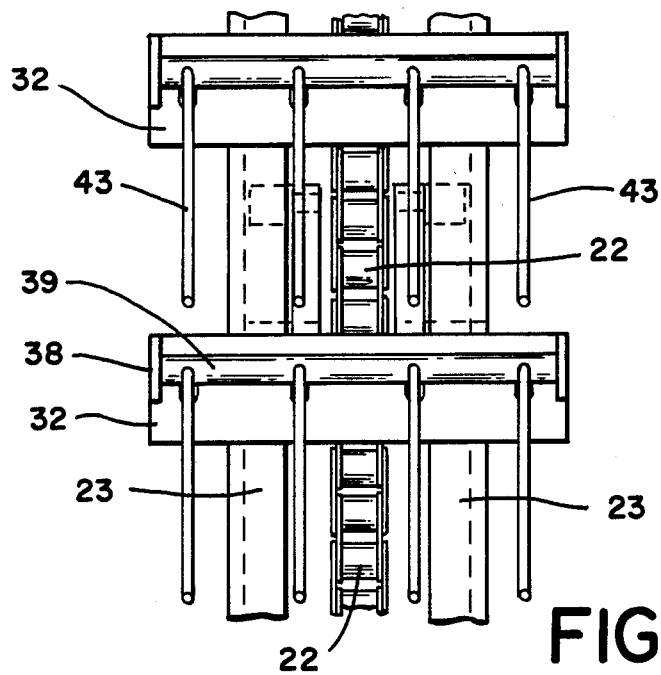
FIG_7
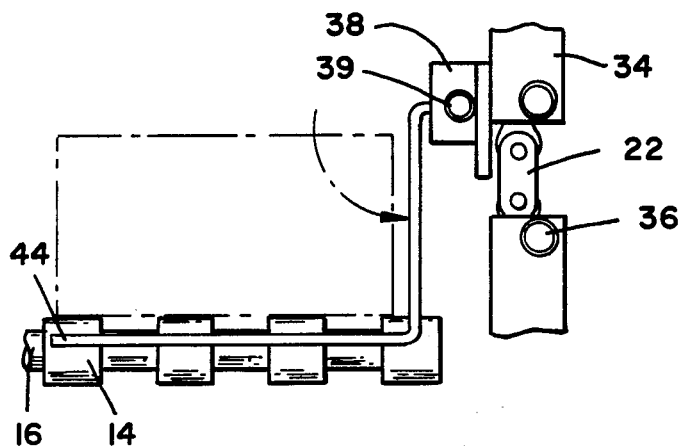
FIG_8
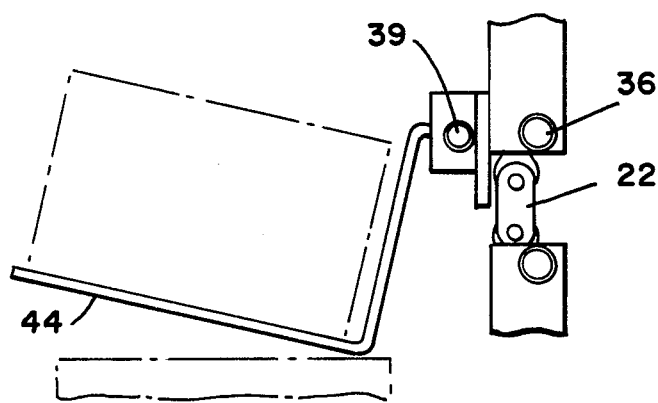
FIG_9

STACK STORAGE ELEVATOR FOR SLICED, STACKED COMESTIBLE PRODUCTS

BACKGROUND OF THE INVENTION

In the field of packaging sliced comestible products such as meat, luncheon meat, and cheese using high speed packaging and slicing equipment, it is highly desirable to transfer the sliced product quickly form the slicer to the packaging machine to avoid contamination of the product. Generally speaking, modern packaging machines operate optimally at a uniform high speed, whereas slicing machines, although swift, have an inherently erratic output. This is due to the fact that the comestible product being sliced often comprises a loaf or a large piece of meat, and there is a hiatus in the output between the end of one piece and the commencement of the subsequent piece. Also, the sliced product is generally placed in stacks each of uniform number of slices, each stack being weight checked. Due to the fact that the packages typically are labeled with a predetermined net weight, the stacks must meet strict weight tolerances. Those stacks that do not meet the weight tolerances are removed from the packaging line conveyor. Thus the slicer loading and the stack weight check cause the ultimate slicer output rate to vary considerably.

Ideally, the conveyor from the slicer should deliver stacks to the packaging machine at a rate exactly matched to the packaging machine rate of loading and sealing the packages. When the slicer is operating optimally, stacks are deposited on the conveyor at regularly spaced intervals, and the conveyor travels at a constant speed to deliver the stacks at the proper rate to the packaging apparatus. However, the slicer loading factor and the weight check procedure occasionally result in removal of a stack from its place on the conveyor, resulting in a vacant spot on the conveyor. Without some remedial apparatus, the vacant spot will travel to the packaging apparatus, the respective package will not be filled, and the packaging apparatus will produce a sealed, empty package.

There are known in the prior art many forms of accumulator devices which detain a number of stacks on some form of storage device interposed in the conveyor line, and deliver each stack serially upon demand from the packaging apparatus. In such accumulators, it is generally necessary to quickly accelerate and stop the stacks entering and leaving the storage area. Due to the intrinsically fragile nature of the stacks of slices, such rough treatment can often result in damage to the stacks which renders them unsuitable for packaging. For example, the stacked may become skewed, the bottom slice may become dislodged or damaged during the acceleration or deceleration, or the like.

SUMMARY OF THE PRESENT INVENTION

The present invention generally comprises an apparatus adapted to operate in conjunction with a conveyor delivering stacks of sliced comestible product to a packaging apparatus, and specifically to provide a steady supply of stacks to the packaging apparatus at a rate which matches the optimal constant rate of operation of the packaging device. A salient feature of the invention is that the conveyor to the packaging device operates at a generally constant speed, and that the stacks thereon are neither detained nor accelerated unduly. Thus the integrity of the stacks is maintained, resulting in a greatly reduced rate of quality control package rejection.

The invention generally comprises a stack storage elevator for sliced, stacked comestible products, and includes a frame assembly disposed adjacent to a roller conveyor segment interposed in the conveyor delivering stacked slices to the packaging apparatus. A pair of vertically spaced sprocket wheels are secured to the frame to support an endless chain loop, one half of the loop traversing a vertically extending guide channel in the frame assembly. A plurality of elevator platform assemblies are provided, each secured to a link of the chain loop and arrayed in spaced, stacked relationship thereabout. Each elevator platform assembly includes a plurality of tines extending in parallel relationship from a pivot shaft joined to the respective chain link. The tines, which are disposed to define a platform adapted to support a stack of sliced comestible product, are spaced to interdigitate with the rollers of the conveyor segment.

Each platform supports one stack of acceptable weight and conformation, and a plurality of platforms are disposed in a vertical column above the roller conveyor segment. It may be appreciated that whenever the slicer output is interrupted, or whenever a stack is rejected for weight error, the regular spacing of stacks on the conveyor from the slicer to the packaging device will be disrupted, and vacant spots will appear where stacks should be located on the conveyor. In this circumstance, a sensor (well-known in the prior art) detects the vacant spot, and actuates drive mechanism for the chain sprockets. The chain mechanism is advanced incrementally to drive a platform downwardly, the tines thereof interdigitating with the rollers to deposit a stack on the rollers. Thus the disrupted spacing of stacks on the conveyor is rectified, and the stack delivery rate is restored to match the rate of demand of the packaging apparatus.

BRIEF DESCRIPTION OF THE DRAWING

FIG. 1 is a partially cutaway perspective view of the stack storage elevator of the present invention.

FIG. 2 is a top view of the stack storage elevator as shown in FIG. 1.

FIG. 3 is an enlarged cross-sectional top view of the stack platform assembly engagement in the channel guide of the present invention.

FIG. 4 is an enlarged cross-sectional side elevation detail of the engagement of a tine of the stack platform with the pivot shaft and mounting plate of the platform.

FIG. 5 is an enlarged top view of the stack storage elevator, showing the guard housing assembled to the frame of the elevator.

FIG. 6 is an enlarged detailed side elevation of the stack platform-drive chain assembly of the present invention.

FIG. 7 is a detailed front elevation showing the stack platform-drive chain assembly of the present invention.

FIG. 8 is a detailed side view of the stack platform-drive chain assembly in relation to the roller conveyor of the present invention, showing a stack being deposited on the roller conveyor.

FIG. 9 is a detailed side view as in FIG. 8, showing a platform descending onto a stack on the roller conveyor and deflecting therefrom.

DESCRIPTION OF THE PREFERRED EMBODIMENT

The present invention generally comprises a stack storage elevator adapted to operate in conjunction with a conveyor delivering stacks of sliced comestible product from a slicer to a packaging apparatus. The stack storage elevator is designed to place stacks of sliced comestible product into vacant spots in the otherwise uniformly spaced linear array of stacks proceeding to the packaging apparatus. The invention thus functions to provide a steady supply of stacks to the packaging apparatus, despite brief interuptions in the slicer output or removal of stacks due to weight error, at a rate which matches the optimal constant rate of operation of the packaging device.

With regard to FIG. 1, the invention includes a housing 11 disposed directly adjacent to a roller conveyor 12. The conveyor 12 is interposed in a conveyor delivery line extending from a high speed slicer to an automated packaging apparatus, both items being well-known in the prior art. The conveyor line delivers stacks of sliced comestible product, such as meat, luncheon meat, cheese, and the like, to the packaging device. As shown in FIG. 2, the rollers 13 of the conveyor 12 comprise annular rings 14 secured fixedly to a plurality of shafts 16 in axially spaced relationship. The shafts extend in a parallel, horizontal array from a housing 17 disposed opposite the housing 11 of the stack storage elevator. Within the housing 17, a rotating drive system is coupled to the shafts 16 to drive them at a generally constant speed and advance the stacks toward the packager. It should be noted that the shafts 16 are spaced longitudinally in the direction of stack travel, and that there is clearance between the rings 14 of adjacent shafts.

Disposed within the housing 11 is a base plate 18 extending generally vertically and parallel to the direction of travel of the conveyor 12. A pair of axles 19 are secured to vertically opposed edges of the plate 18 (although only one is shown in FIG. 1 for purposes of clarity). Joined to each axle 19 is a sprocket wheel 21, and an endless loop 22 of chain links is secured about the sprocket wheels 21. One of the axles 19 is connected to an intermittent rotary drive mechanism, such as a magnetic clutch, stepper motor, or the like, and adapted to be selectively actuated to rotate the sprocket wheels and advance the chain 22 through a predetermined and limited amount of travel.

The invention also includes a pair of guide rail members 23 extending verically and spaced apart longitudinally. The guide rail members 23 are secured to the base plate 18 by a pair of angle brackets, each extending vertically and bolted to the plate and to a respective one of the guide rail members. The guide rail members (FIG. 3) each include a vertically extending channel 26, the channels 26 opening toward each other in confronting, parallel relationship.

A salient feature of the invention is the provision of a plurality of platform assemblies 31, each adapted to support one stack of sliced comestible product identical to the stacks passing along the conveyor 12. As shown in FIG. 3 and all other Figures, each platform assembly 31 includes a longitudinally extending panel 32. A pair of link brackets 33 extend from one of the links of the chain 22 to the rear surface of the panel 32 to join the panel rigidly thereto. A pair of mounting bars 34 extend outwardly from the rear surface of the panel 32 in opposed, parallel relationship. Two pairs of rollers 36 are provided, each roller 36 being journalled in one of the bars 34. The bars 34 and the rollers 36 are spaced and dimensioned so that the rollers 36 are disposed to traverse the channels 26 of the guide rails 23.

With regard to FIG. 6, it should be noted that the rollers are arrayed in upper and lower pairs, both pairs travelling within the respective channel 26. This arrangement determines that the bars 34 are maintained in a generally vertical alignment, and the panel 32 is maintained in a fixed angle with respect to vertical when the rollers are within the channels 26. Furthermore, the guide rails 23 provide horizontal positioning of the platforms as they translate vertically, so that the platforms do not shift laterally as they translate vertically.

Each of the platforms also includes a pair of end walls 38 extending from opposed ends of the panel 32. A pivot shaft 39 extends between the end walls 38 and is journalled therein in rotatable fashion. A plurality of tines 41 are also provided, each tine including an upper portion 42 (FIG. 4) extending through the shaft 39 and through a slot 40 in the panel 32. The tines are spaced along the length of the shaft 39 at equal intervals, the intervals being identical to the spacings between the rollers 13 of the conveyor 12. Thus the tines are disposed to pass between the rollers as the platforms descend.

A medial portion 43 of each tine 41 extends generally parallel to the chain portion adjacent thereto, and a distal portion 44 of each tine extends orthogonally from the medial portion in a generally horizontal disposition, as shown particularly in FIG. 6. The distal portions 44 of the tines 41 together define a platform having sufficient width and depth to support a stack of slices of comestible product, as shown in FIG. 8, such as the stacks proceeding along the conveyor 12. It may be appreciated that as a platform descends past the plane of the conveyor 12, the stack supported on the tines is transferred and deposited on the conveyor 12 as the tines pass between the rollers 13.

As shown in FIG. 3, a torsion spring 46 is secured about each shaft 39 and anchored between the panel 32 and the shaft 39. The spring 46 is disposed to urge the shaft 39 to rotate in a counterclockwise direction, as shown in FIG. 8, to maintain the tines rotated downwardly with the portions 44 in the horizontal position of FIG. 8. Indeed, with reference to FIG. 4, the slots 40 in the panel 32 define a limit of travel for the tines, so that the tines are rotated to the horizontal position and no farther. However, in the unlikely event that the distal portions of the tines strike a stack of slices or some other object as they descend, the force of collision with the object will drive the shaft 39 to rotate clockwise, as shown in FIG. 9, to prevent destruction of the platform assembly involved in the collision, and avoid damage to the entire elevator mechanism.

It should be noted that the chain 22 mounted on the sprocket wheels 21 circulates about the base plate 18, with the forward portion of the chain loop descending adjacent to the front surface of the plate 18, and the rear portion of the chain loop ascending adjacent to the rear surface of the plate 18. To guide the ascending portion of the chain loop, a single guide track 48 is joined to the rear surface of the base plate 18 in vertically extending fashion, the track 48 being dimensioned to be received between the bars 34 of the platform assemblies 31 as they ascend, as shown in FIG. 2.

With regard to FIGS. 1, 2, and 5, the housing 11 also includes a pair of guard panels 51 extending forwardly from the housing and superjacently of the conveyor 12, with sufficient clearance between the lower edges of the guard panels 51 and the conveyor to permit the passage of stacks supported thereon. The guard panels 51 aid in protecting the stacks supported on the platforms 31, preventing contamination from dirt and dust, and also preventing incidental impact on the elevator components which might otherwise disrupt the stacks or damage the apparatus.

In the preferred embodiment, a large plurality of platform assemblies 31 are provided, with as many as eight or more disposed in vertically stacked, closed spaced array (see FIG. 7) within the confines of the guard panels. Each of the platform assemblies supports a stack of sliced comestible product on the portions 44 of its tines 41. The invention operates in conjunction with sensor and control devices, readily available in the prior art, which detect a vacant spot in the otherwise evenly spaced progression of stacks passing over the conveyor 12. Whenever a vacant spot is detected, the drive mechanism connected to the sprocket wheels 21 is actuated to advance the chain 22 an incremental amount sufficient to cause the lowermost platform assembly 31 to descent and deposit its stack on the conveyor 12. Of course, the operation is timed and synchronized to place the stack directly in the vacant spot, so that the regular flow of stacks to the packaging apparatus is restored. After the platform assembly 31 has deposited its stack, subsequent incremental actuation of the device causes it depart the guide channels 26 and to travel about the lower sprocket wheel 21, ascend up the guide track 48, traverse the upper sprocket wheel 21, and reengage the guide channels 26 at the upper end of the guide rails 23. At this point the platform assembly may be reloaded with a stack of acceptable weight and conformance, either by manual or mechanical means.

It should be emphisized that the present invention succeeds in rectifying the occasionally erratic output of the product slicer and weight check devices, to form an uninterrupted stream of stacks delivered to the product packaging apparatus. This is achieved without subjecting the stacks to undue acceleration, queuing, or abrasion which might damage the stacks and cause product rejection.

What is claimed is:

1. A storage elevator for comestible items, including; a roller conveyor adapted to transport said items in a linear array of generally regularly spaced items, means for depositing additional like items on said roller conveyor in vacant spots of said linear array, including a plurality of platform assemblies disposed in vertically stacked fashion adjacent to said roller conveyor, each platform assembly including means for supporting an additional like item, means for advancing said platform assemblies in stepwise, descending fashion, each stepwise advance driving the lowermost of said platform assemblies in said vertical stack to deposite the item supported thereon onto said roller conveyor, means for enabling rotation of each of said platform assemblies with respect to said vertical stack and said roller conveyor, including a plurality of pivot shafts each extending in rotating fashion between one of said platform assemblies and said means for advancing said platform assemblies in stepwise, descending fashion.

2. The storage elevator of claim 1, wherein said means for advancing said platform assemblies includes an endless drive loop secured to each of said platform assemblies.

3. The storage elevator of claim 2, further including a pair of guide rails extending generally upwardly and including confronting, parallel, vertical guide channels therein, said platform assemblies each including at least one pair of guide rollers adapted to be received in said guide channels in freely translating fashion.

4. The storage elevator of claim 3, wherein each of said platform assemblies includes two pair of guide rollers, each pair spaced apart along said guide channels to maintain said platform assembly in a fixed relationship to said guide rails as it translates therealong.

5. The storage elevator of claim 2, wherein said endless drive loop comprises an endless chain of discrete links, and means for securing each of said platform assemblies to a chain link.

6. The storage elevator of claim 5, further including a pair of sprocket wheels disposed in vertically spaced relationship and adapted to engage said chain, one of said sprocket wheels being adapted to be driven in incremental fashion to impart said stepwise, descending motion to said platform assemblies.

7. The storage elevator of claim 1, wherein each of said platform assemblies includes a plurality of tines joined thereto, said tines including like portions extending outwardly from said platform assembly to define a platform adapted to support one of said comestible items.

8. The storage elevator of claim 7, wherein each of said tines includes a first portion, a second portion extending orthogonally from said first portion, and a third portion extending orthogonally from said second portion and in parallel, opposed relationship to said first portion.

9. The storage elevator of claim 8, wherein each of said platform assemblies includes means for joining said first portions of said tines to said shaft for rotational movement therewith.

10. The storage elevator of claim 9, including means for resiliently urging said shaft to rotate axially, and stop means for limiting rotation of said shaft in one direction to an angle at which said third portions of said tines define a generally horizontal platform.

11. The storage elevator of claim 7, wherein said tines are spaced apart at intervals equal to the spacing of the rollers of said roller conveyor, said tines interdigitating with said rollers of said roller conveyor as said platform assemblies descend past said roller conveyor to deposit said items on said roller conveyor.

12. A storage elevator for stacks of comestible product, including;
a roller conveyor adapted to transport stacks of comestible product;
a base plate extending generally upwardly adjacent to said roller conveyor;
an endless chain loop supported on said base plate and disposed in vertical orientation,
a plurality of platform assemblies, and means for securing each of said platform assemblies to a link of said chain loop,
a pair of guide rails secured to said base plate in upwardly extending orientation, said guide rails including a pair of guide channels extending vertically in parallel, confronting, opposed relationship,
each of said platform assemblies including guide roller means disposed to be engaged in said guide channels in free vertical, non-lateral translation, each of said platform assemblies including a plurality of tines spaced at intervals equal to the spacing of the rollers of said roller conveyor, said tines adapted to pass between said rollers of said roller conveyor, pivot shaft means for joining said tines of each of said platform assemblies to the respective link of said chain loop in pivoting fashion with respect to said roller conveyor, resilient means for biasing each of said platform assemblies to pivot to a generally horizontal disposition when said platform assemblies are engaged in said guide channels, said plurality of tines including like portions disposed to define a platform, each platform dimensioned to support a further stack of comestible product.

* * * * *